United States Patent
Lin et al.

(10) Patent No.: US 7,610,497 B2
(45) Date of Patent: Oct. 27, 2009

(54) POWER MANAGEMENT SYSTEM WITH A BRIDGE LOGIC HAVING ANALYZERS FOR MONITORING DATA QUANTITY TO MODIFY OPERATING CLOCK AND VOLTAGE OF THE PROCESSOR AND MAIN MEMORY

(75) Inventors: Ruei-Ling Lin, Taipei (TW); Jiin Lai, Cupertino, CA (US); Hung-Yi Kuo, Taipei (TW)

(73) Assignee: Via Technologies, Inc., Taipei (TW)

( * ) Notice: Subject to any disclaimer, the term of this patent is extended or adjusted under 35 U.S.C. 154(b) by 1109 days.

(21) Appl. No.: 11/048,191

(22) Filed: Feb. 1, 2005

(65) Prior Publication Data
US 2006/0174151 A1    Aug. 3, 2006

(51) Int. Cl.
*G06F 1/26* (2006.01)
(52) U.S. Cl. ............... 713/320; 713/300; 713/321; 713/322; 713/323
(58) Field of Classification Search ............ 713/300, 713/323, 340, 500, 501, 320, 321, 322; 718/1, 718/105
See application file for complete search history.

(56) References Cited

U.S. PATENT DOCUMENTS

| | | | | |
|---|---|---|---|---|
| 5,530,941 A * | 6/1996 | Weisser et al. | ............... | 711/151 |
| 5,701,514 A | 12/1997 | Keener | | |
| 6,055,590 A * | 4/2000 | Pettey et al. | ............... | 710/56 |
| 6,151,262 A * | 11/2000 | Haroun et al. | ............... | 365/227 |
| 6,584,571 B1 * | 6/2003 | Fung | ............... | 713/310 |
| 6,988,211 B2 * | 1/2006 | Cline et al. | ............... | 713/300 |
| 7,017,060 B2 * | 3/2006 | Therien et al. | ............... | 713/323 |
| 7,085,943 B2 * | 8/2006 | Chun et al. | ............... | 713/300 |
| 7,203,767 B2 * | 4/2007 | Khanna et al. | ............... | 709/248 |
| 7,237,129 B2 * | 6/2007 | Fung | ............... | 713/323 |
| 7,257,721 B2 * | 8/2007 | Chung et al. | ............... | 713/300 |
| 7,484,111 B2 * | 1/2009 | Fung | ............... | 713/320 |
| 7,533,283 B2 * | 5/2009 | Fung | ............... | 713/322 |
| 2006/0041611 A1 * | 2/2006 | Fujita et al. | ............... | 709/200 |
| 2006/0168442 A1 * | 7/2006 | Khanna et al. | ............... | 713/2 |
| 2006/0174142 A1 * | 8/2006 | Lin et al. | ............... | 713/300 |

FOREIGN PATENT DOCUMENTS

| | | |
|---|---|---|
| CN | 1262466 | 8/2000 |
| TW | 528945 | 4/2003 |
| TW | I220941 | 9/2004 |

OTHER PUBLICATIONS

English abstract of TW I220941.
English abstract of TW 528945.
English abstract of CN 1262466.
Office Action of TW issued on Feb. 25, 2009.
China Office Action mailed Dec. 8, 2006.

* cited by examiner

*Primary Examiner*—Meng-Ai An
*Assistant Examiner*—Tammy Lee
(74) *Attorney, Agent, or Firm*—Thomas, Kayden, Horstemeyer & Risley

(57) ABSTRACT

A core logic coupled to a main memory of a computer, comprising an analyzer and a power management unit. The analyzer monitors access request traffic load of main memory. The power management unit employs various power performance trade-off activities with the knowledge of the monitored traffic load according to the state machine.

19 Claims, 5 Drawing Sheets

POWER MANAGEMENT SYSTEM WITH A BRIDGE LOGIC HAVING ANALYZERS FOR MONITORING DATA QUANTITY TO MODIFY OPERATING CLOCK AND VOLTAGE OF THE PROCESSOR AND MAIN MEMORY

BACKGROUND

The invention relates to traffic analyzer, and particularly, to traffic analyzer and accordingly power state management in bridge logic.

Power management has become a significant issue in computer design. Central processing units (CPUs) and main memories (random access memories, RAMs) typically consume more power than other units in a computer system as they operate at high clocking frequency. Therefore, CPUs and main memory both play a critical role in reducing computer system power consumption and performance efficiency.

The Advanced Configuration and Power Interface (ACPI) specification provides several methods of controlling processor performance states via operating system-directed configuration and power management (OSPM), by which CPUs may be transited to performance states of high operating voltage and frequency when busy. Managing CPU performance states by an OS, however, may be a heavy load for a busy CPU and may thus reduce CPU efficiency.

Additionally, desired power saving may be improved by aggressive power management, which is typically performed by an OS. Frequent activities caused by aggressive power management, however, may adversely affect CPU performance.

As is well known in the art, the clock frequency of random access memory (RAM) can be configured via the basic input/output system (BIOS) before a system boot. Despite the run-time variation of main memory access workload, a main memory operates at a configured clock frequency until the system shuts down. Infrequently serving access activities at high main memory operating frequency consumes excessive power, while frequently serving access activities at low main memory operating frequency is inefficient.

SUMMARY

The preset invention provides a traffic analyzing method and the accordingly power state management of a bridge logic. It is, the bridge logic capable of power state management in the present invention could aggressively manage power consumptions according to the traffic load of CPU and main memory without increasing CPU workload.

Bridge logic with capable of power state management in the present invention comprises a buffer; an analyzer; and a power management unit. The bridge logic is connected between a processor and a main memory of a computer system.

When determining traffic load of the processor, the buffer stores data transferred by the processor; and the analyzer monitors accessing traffic load of the buffer. If the data quantity exceeds a default threshold value, the processor is regarded as having a high traffic load; on the other hands, if the data quantity doesn't exceed a default threshold value, the processor is regarded as having a low traffic load. According to the traffic load states, the power management unit adjusts operating clocks and operating voltage of the processor.

Similarly, when determining traffic load of the main memory, the buffer storing transferred requests of the main memory; and the analyzer monitors accessing traffic load of the buffer. If the number of the request exceeds a default threshold value, the main memory is regarded as having a high traffic load; on the other hands, if the number of the request doesn't exceed a default threshold value, the main memory is regarded as having a low traffic load. According to the traffic load states, the power management unit adjusts operating clocks and operating voltage of the main memory.

A power state management method of bridge logic in the present invention comprising: monitoring traffic load of a processor or a main memory; adjusting operating status of the processor and the main memory according to the traffic load states.

DESCRIPTION OF THE DRAWINGS

The invention can be more fully understood by reading the subsequent detailed description and examples with references made to the accompanying drawings, wherein.

DETAILED DESCRIPTION

A bridge logic, in a computer system, capable of power state management of a processor and a main memory is provided, some embodiments include but are not limited to a bridge logic or a memory controller hub.

Figure 1:
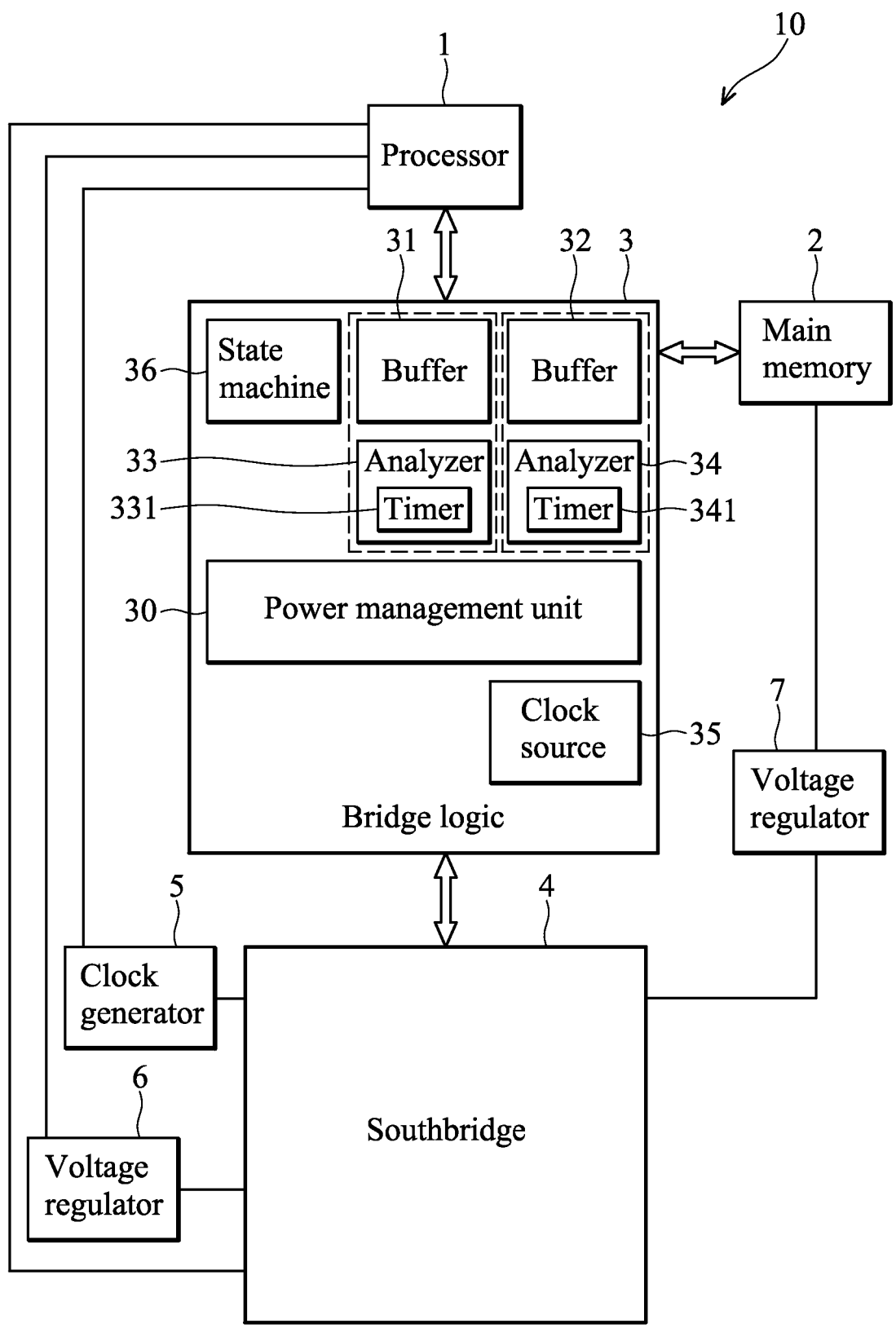
FIG. 1 is a block diagram of the configuration of an embodiment of a computer.

FIG. 1 shows a computer system 10 comprising: a bridge logic 3 connected between a processor 1 and a main memory 2; a south bridge 4 connected to bridge logic 3; a clock generator 5 and a voltage regulator 6 respectively connected between processor 1 and south bridge 4; and a voltage regulator 7, connected between main memory 2 and south bridge 4. It is well known by skilled in the arts that computer 10 may comprise more processors.

In the present invention, the bridge logic 3 monitors the traffic load of processor 1 and main memory 2 and then adjusts the operating statuses of processor 1 and main memory 2 according to the traffic load states respectively.

In the present invention, bridge logic 3 capable of power state management comprising: a first buffer 31, storing data transferred by the processor 1; a first analyzer 33, monitoring the accessing traffic load of the first buffer 31; a second buffer 32, storing transferred requests of main memory 2; a second analyzer 34, monitoring the accessing traffic load of the second buffer 32; and a power management unit 30, adjusting operating statuses of the processor 1 and the main memory 2 respectively. Otherwise, the bridge logic capable of power state management further comprises a state machine 36 and a clock source 35.

Power management unit 30 employs various power performance trade-off activities with the knowledge of the monitored traffic load according to state machine 36 as will be described later.

First buffer 31 may further comprise two separate buffers for respectively storing data transmitted to and from processor 1.

First analyzer 33 counts the quantity of the transferred data stored in first buffer 31, for example in a unit of byte, during a period of time. First analyzer 33 may comprise a first timer 331 as shown in FIG. 1.

Figure 2:
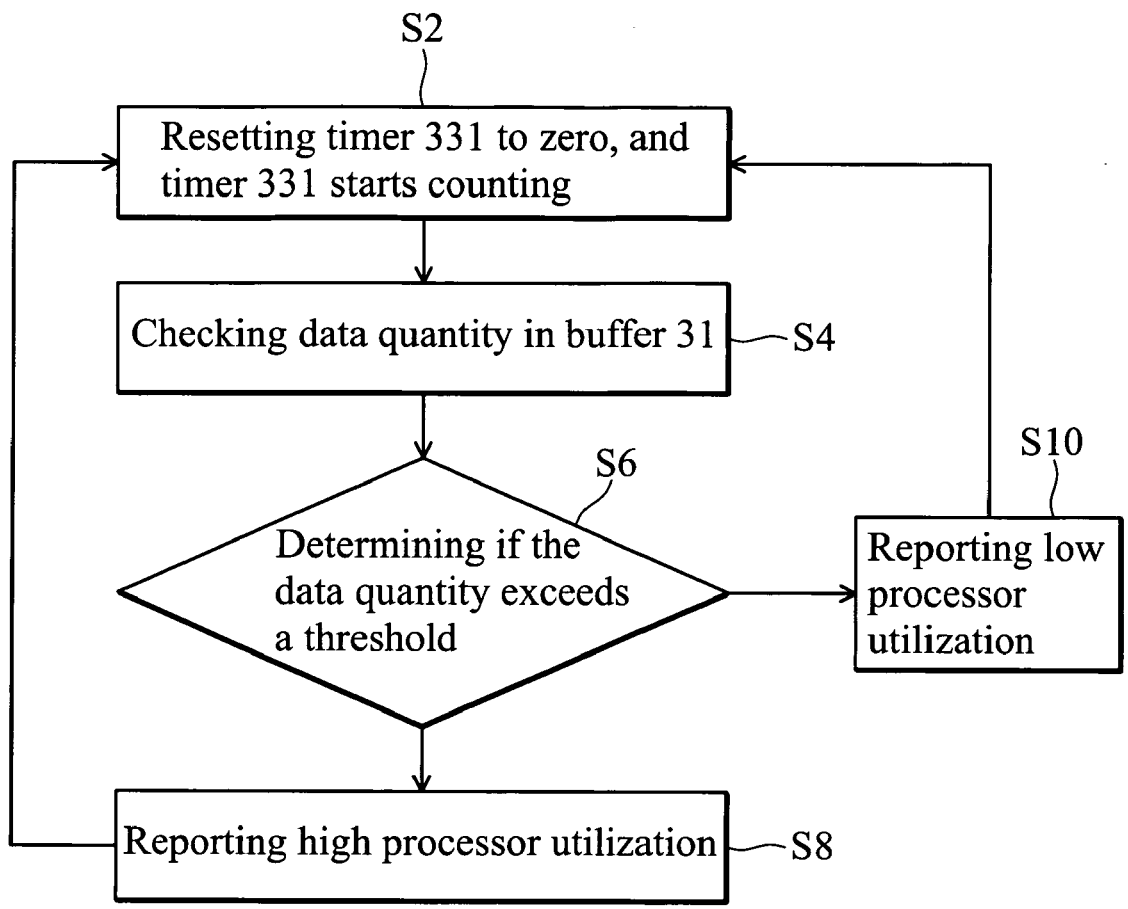
FIG. 2 is a flowchart of an embodiment of processor utilization analysis performed by an analyzer.

The traffic analyzing method for monitoring traffic load of processor 1 in the present invention as shown in FIG. 2, including the following steps: first analyzer 33 resets first timer 331 and then first timer 331 starts to count (step S2); when first timer 331 expires, first analyzer 33 checks the data quantity in first buffer 31 (step S4); and then first analyzer 33 determines if the data quantity exceeds a first threshold value (step S6). If so, first analyzer 33 reports a high processor traffic load to power management unit 30 (step S8); else, first analyzer 33 reports a low processor traffic load to power management unit 30 (step S10). The threshold value may vary by analyzer.

Similarly, second analyzer 34 counts the number of the transferred request in second buffer 32 during a period of time. Second analyzer 34 may comprise a second timer 341 as shown in FIG. 1.

Figure 3:
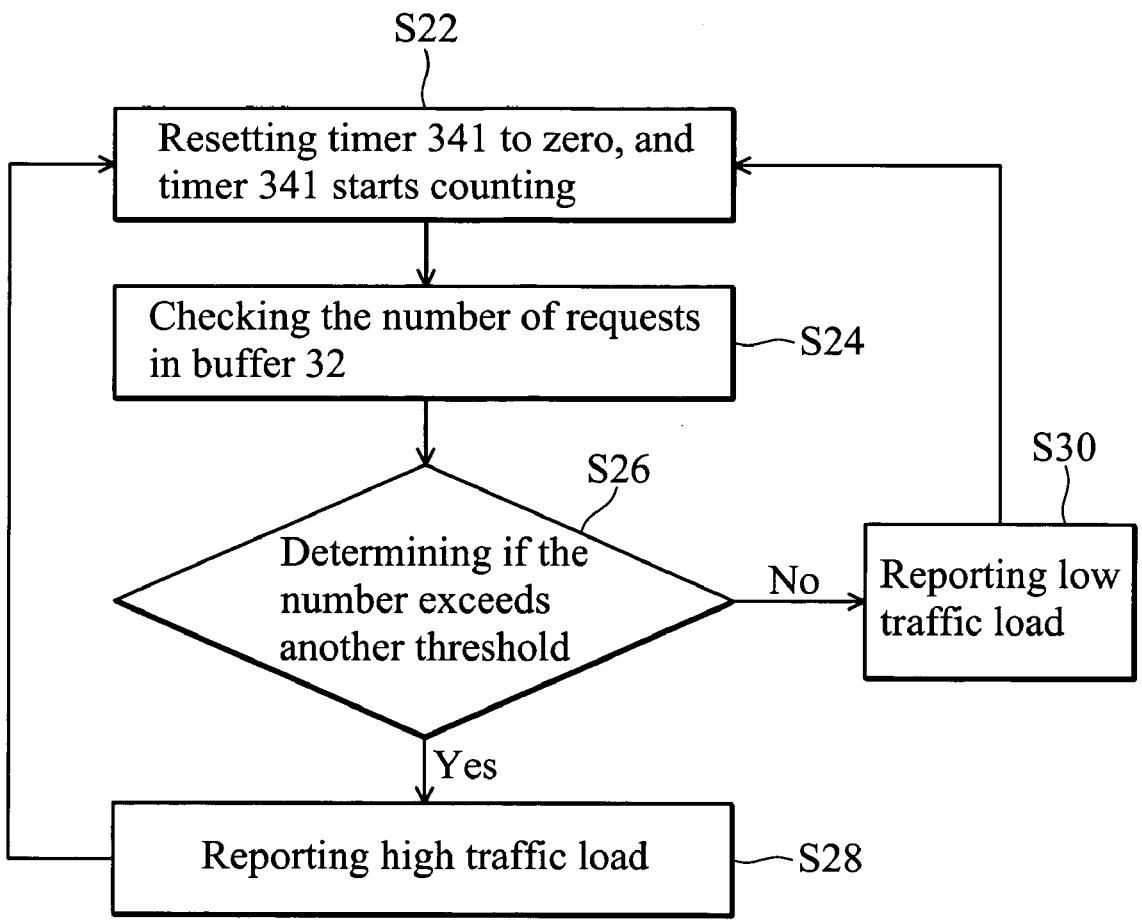
FIG. 3 is a flowchart of an embodiment of traffic load analysis of main memory.

The traffic analyzer method for monitoring traffic load of main memory 2 in the present invention as shown in FIG. 3, including the following steps: second analyzer 34 resets the second timer 341 and then second timer 341 starts to count (step S22); when second timer 341 expires, second analyzer 34 checks the number of requests in second buffer 32 (step S24); and then second analyzer 24 determines if the number exceeds a second threshold value (step S26). If so, second analyzer 34 reports a high main memory traffic load to power management unit 30 (step S28); else, second analyzer 34 reports a low main memory traffic load to power management unit 30 (step S30).

The data counting of the first analyzer 33 and the second analyzer 34 is not limited thereto.

In the present invention, bridge logic 3 monitors the traffic load of the processor via first analyzer 33 and monitors the traffic load of the main memory via second analyzer 34.

After determining traffic load of processor 1 and main memory 2, the power management unit 30 employs various power performance trade-off activities with the knowledge of the monitored traffic load according state machine 36.

Figure 4:
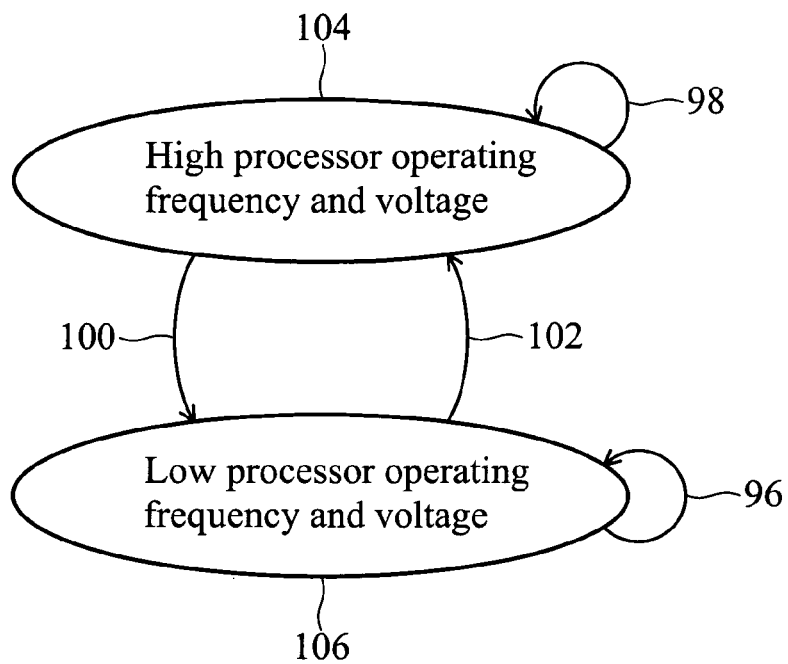
FIG. 4 is a schematic diagram of processor operating states and transitions thereof.

FIG. 4 is a schematic diagram of processor operating statues and transition thereof in state machine 36.

Assuming that processor 1 is in state 106, if the quantity of the data transferred by the processor 1 exceeds the first threshold value, the processor 1 is regarded as having a high traffic load. Thus power management unit 30 increasingly adjusts operating status of processor 1. From the view of state machine 36, processor 1 is transited from state 106 to state 104 (transition 102). If the quantity of the data transferred by the processor 1 doesn't exceed the first threshold value, processor 1 would remains in state 106 (transition 96). It's noticed that the operating statuses include operating clocks and operating voltage.

For example, state 104 may correspond to an overclocking status wherein processor 1 runs in an operating frequency faster than a normal frequency for which it has been tested and approved, and state 106 may correspond to the normal frequency. In transition 102, power management unit 30 increases the operating frequency and voltage of processor 1. The operating frequency and voltage of processor 1 can be adjusted by clock generator 5 and voltage regulator 6 respectively. Thus, power management unit 30 may perform processor operating state transitions by controlling clock generator 5 and voltage regulator 6.

During operating state transitions of processor 1, bridge logic 3 may stop processor 1 from running and suspend data transmitted thereto, making state transitions of processor 1 software-invisible.

Assuming processor 1 is in state 104, if the quantity of the data transferred by the processor 1 doesn't exceed the first threshold value, the processor 1 is regarded as having a low traffic load. Thus power management unit 30 reversely adjusts operating status of processor 1. From the view of state machine 36, processor 1 leaved from state 104 to state 106 (transition 100). If the quantity of the data transferred by of the processor 1 doesn't exceed the first threshold value, processor 1 would remain in state 104 (transition 98).

Figure 5:
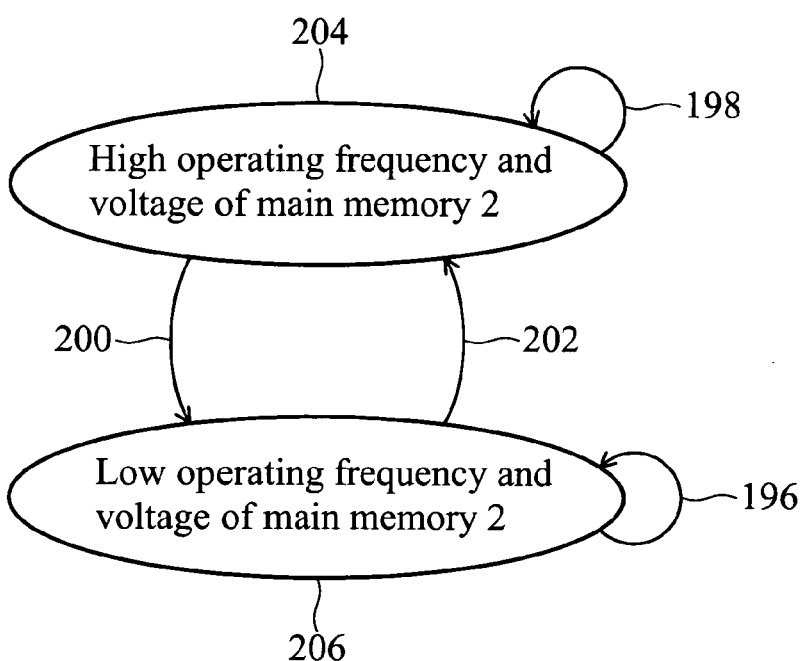
FIG. 5 is a schematic diagram of an embodiment of main memory operating states and transition thereof.

FIG. 5 is a schematic diagram of main memory operating states and transition thereof in state machine 36.

Assuming that main memory 2 is in state 204, if the number of the transferred request of the main memory 2 doesn't exceed the second threshold value, the main memory 2 is regarded as having a low traffic load. Thus power management unit 30 reversely adjusts operating status of main memory 2. From the view of state machine 36, main memory 2 is transited from state 204 to state 206 (transition 200). If the number of the transferred request of the main memory 2 exceeds the second threshold value, main memory 2 would leave state 204 (transition 198). It's noticed that the operating statuses include operating clocks and operating voltage.

For example, state 206 may correspond to non-page mode wherein only one page within main memory 2 is opened for each memory access, and state 204 may correspond to a page mode wherein a plurality of pages within main memory 2 are opened for each memory access. Operating frequency and voltage of main memory 2 can be adjusted by clock source 35 and voltage regulator 7 respectively. Power management unit 30 may perform operating state transitions of main memory 2 by controlling clock source 35 and voltage regulator 7. During operating state transitions of main memory 2, bridge logic 3 may stall access to main memory 2, making state transitions of main memory 2 software-invisible.

Assuming main memory 2 is in state 206, if the number of the transferred requests of the main memory exceeds the second threshold value, the processor 1 is regarded as having high traffic load. Thus power management unit 30 increases operating status of main memory 2. From the view of state machine 36, main memory leaved from state 206 to state 204 (transition 202). If the number of the transferred requests of the main memory doesn't exceed the second threshold value, main memory would remain in state 206 (transition 196).

Table 1 summarizes the operating status management of processor 1 and main memory 2, wherein "Low RAM activities" and "High RAM activities" represent low and high main memory 2 traffic load respectively, and "Low CPU activities" and "High CPU activities" represent low and high processor traffic load of data transmitted to or from processor 1 respectively.

TABLE 1

|  | Low RAM activities | High RAM activities | Low CPU activities | High CPU activities |
|---|---|---|---|---|
| Processor frequency |  |  | Low | High |
| Processor voltage |  |  | Low | High |

TABLE 1-continued

|  | Low RAM activities | High RAM activities | Low CPU activities | High CPU activities |
|---|---|---|---|---|
| Main memory operating frequency | Low | High | | |
| Main memory operating voltage | Low | High | | |
| Page mode or non-page mode | non-page mode | page mode | | |

Some functions corresponding to the entries in Table 1 may be activated or disabled.

Figure 6:
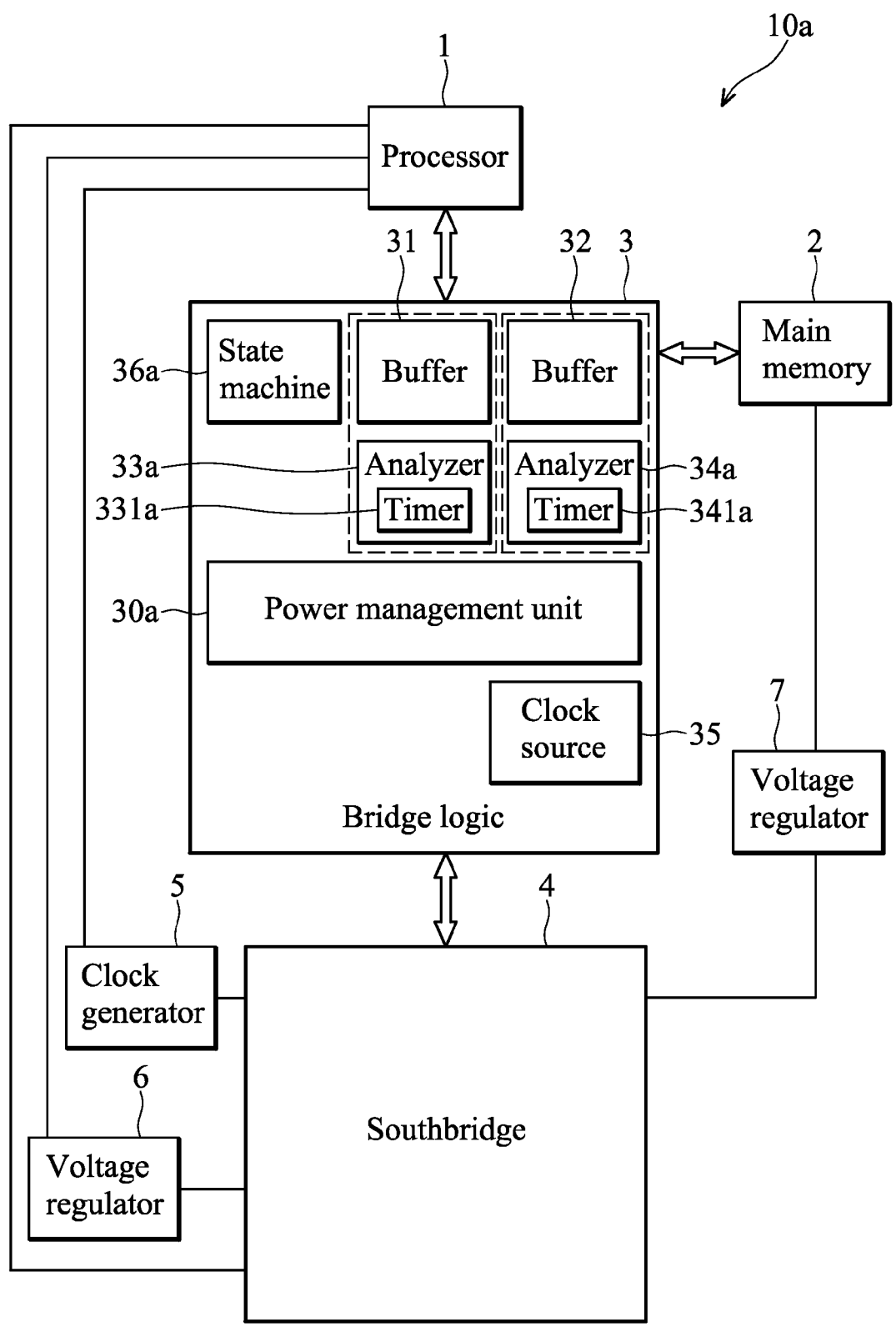
FIG. 6 is a block diagram of the configuration of another computer.

In FIG. 6, a computer 10a is similar to computer 10 except that which is described in the following. First analyzer 33a reports the data quantity in buffer 31 instead of two processor traffic load statuses. The power management method of the embodiment comprising: first analyzer 33a resets first timer 331a to zero and then first timer 331a starts to count; when first timer 331a expires, first analyzer 33a checks and reports the data quantity in buffer 31 to power management unit 30a. Similarly, second analyzer 34a reports the number of the requests in buffer 32 instead of two main memory traffic load statuses.

State machine 36a comprises more operating states of processor 1 and main memory 2 than state machine 36 and tracks the present operating state thereof. Each operating state of processor 1 corresponds to a range of data quantity. Each operating state of main memory 2 corresponds to a range of the number of requests. When receiving reports from first analyzer 33a and second analyzer 34a, power management unit 30a determines which range encompasses the received reports. Power management unit 30a adjusts the operating frequency and voltage of processor 1 and main memory 2 to specific states corresponding to the determined ranges.

Thus, the disclosed bridge logic monitors traffic load of data and request passed to and/or from a processor and a main memory.

Thus, the disclosed bridge logic can adjust operating frequency and voltage of a processor and a main memory accordingly.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bridge logic for managing power consumption of a processor and a main memory, wherein the processor accesses the main memory through the bridge logic, the bridge logic comprising:
   a first buffer space for temporarily storing data from the processor;
   a second buffer space for temporarily storing data from the main memory;
   a first analyzer for monitoring data quantity of the first buffer space in a first period of time to determine if the data quantity of the first buffer space exceeds a first threshold value;
   a second analyzer for monitoring data quantity of the second buffer space in a second period of time to determine if the data quantity of the second buffer space exceeds a second threshold value; and
   a power management unit, coupled to the first analyzer and the second analyzer, for modifying an operating clock and an operating voltage of the processor and an operating clock and an operating voltage of the main memory based on information from the first analyzer and the second analyzer.

2. The bridge logic of claim 1, wherein the power management unit further increases the operating clock and the operating voltage of the processor, the first analyzer determines that the data quantity of the first buffer space exceeds the first threshold value in the first period of time.

3. The bridge logic of claim 1, wherein the power management unit further reduces the operating clocks and the operating voltage of the processor, when the first analyzer determines that the data quantity of the first buffer space does not exceed the first threshold value in the first period of time.

4. The method of claim 1, further comprising decreasing, by the bridge logic, the operating clock and the operating voltage of the processor, or the operating clock and the operating voltage of the main memory, in response of that the data quantity of the buffer does not exceed the threshold value in the period of time.

5. The method of claim 1, wherein the buffer comprises a first space for temporarily storing data from the processor, and a second space for temporarily storing data from the main memory.

6. The method of claim 5, further comprising monitoring, by the bridge logic, the first space of the buffer in a first period of time to determine if the data quantity from the processor exceeds a first threshold value, and accordingly modifying the operating clock and the operating voltage of the processor.

7. The method of claim 5, further comprising monitoring, by the bridge logic, the second space of the buffer in a second period of time to determine if the data quantity from the main memory exceeds a second threshold value, and accordingly modifying the operating clock and the operating voltage of the main memory.

8. The method of claim 7, further comprising operating the main memory in page mode in response of that the data quantity from the main memory exceeds the second threshold value within the second period of time, and operating the main memory in non-page mode in response of that the data quantity from the main memory does not exceed the second threshold value within the second period of time.

9. The bridge logic of claim 1, wherein the power management unit further increases the operating clock and the operating voltage of the main memory, when the second analyzer determines that the data quantity of the second buffer space exceeds the second threshold value in the second period of time.

10. The bridge logic of claim 9, wherein the main memory is operated in page mode.

11. The bridge logic of claim 1, wherein the power management unit further reduces the operating clock and the operating voltage of the main memory, when the second analyzer determines that the data quantity of the second buffer space does not exceed the second threshold value in the second period of time.

12. The bridge logic of claim 11, wherein the main memory is operated in non-page mode.

13. A computer system for power management, comprising:
   a processor;
   a main memory;

a bridge logic coupled between the processor and the main memory, wherein the processor accesses the main memory through the bridge logic; and a southbridge logic coupled to the bridge logic, wherein the bridge logic comprises:

a first buffer space for temporarily storing data from the processor;

a second buffer space for temporarily storing data from the main memory;

a first analyzer for monitoring data quantity of the first buffer space in a first period of time to determine if the data quantity of the first buffer space exceeds a first threshold value;

a second analyzer for monitoring data quantity of the second buffer space in a second period of time to determine if the data quantity of the second buffer space exceeds a second threshold value; and a power management unit, coupled to the first analyzer and the second analyzer, for modifying an operating clock and an operating voltage of the processor, and an operating clock and an operating voltage of the main memory.

14. The computer system of claim 13, wherein the power management unit further increases the operating clock and the operating voltage of the processor, when the first analyzer determines that the data quantity of the first buffer space exceeds the first threshold value in the first period of time.

15. The computer system of claim 13, wherein the power management unit further reduces the operating clock and the operating voltage of the processor, when the first analyzer determines that the data quantity of the first buffer space does not exceed the first threshold value in the first period of time.

16. The computer system of claim 13, wherein the power management unit further increases the operating clock and the operating voltage of the main memory, when the second analyzer determines that the data quantity of the second buffer space exceeds the second threshold value in the second period of time.

17. The computer system of claim 16 wherein the main memory is operated in page mode.

18. The computer system of claim 13, wherein the power management unit further reduces the operating clock and the operating voltage of the main memory, when the second analyzer determines that the data quantity of the second buffer space does not exceed the second threshold value in the second period of time.

19. The computer system of claim 18, wherein the main memory is operated in non-page mode.

* * * * *